United States Patent [19]

Webb, Sr. et al.

[11] Patent Number: 4,644,990

[45] Date of Patent: Feb. 24, 1987

[54] AUTOMATIC CLOSING SYSTEM FOR WINDOW BLINDS

[75] Inventors: James E. Webb, Sr., Richardson, Tex.; William F. Dunn, 6050 Melody La., Unit 105, Dallas, Tex. 75231

[73] Assignee: William F. Dunn, Dallas, Tex.

[21] Appl. No.: 771,605

[22] Filed: Sep. 3, 1985

[51] Int. Cl.⁴ .............................................. E06B 9/322
[52] U.S. Cl. .................................. 160/5; 160/176 R; 160/178 C
[58] Field of Search ................. 160/DIG. 17, 5, 8, 9, 160/178 C, 313, 176 R, 168 R, 166 R

[56] References Cited

U.S. PATENT DOCUMENTS

| | | |
|---|---|---|
| 1,335,929 | 4/1920 | Allen . |
| 1,791,151 | 2/1931 | Tarvid . |
| 2,117,529 | 4/1938 | Wile et al. . |
| 2,149,481 | 3/1939 | Bosch et al. . |
| 2,489,879 | 11/1949 | Grebe . |
| 2,501,418 | 3/1950 | Snowden, Jr. . |
| 2,980,970 | 4/1961 | Dickinson . |
| 3,042,001 | 7/1962 | Dubie et al. . |
| 3,064,131 | 11/1962 | Brown . |
| 3,163,892 | 1/1965 | Hager, Jr. . |
| 3,177,367 | 4/1965 | Brown . |
| 3,249,148 | 5/1966 | Zablodil et al. . |
| 3,276,942 | 10/1966 | Ewing . |
| 3,294,151 | 12/1966 | Hartley et al. . |
| 3,646,985 | 3/1972 | Klann ........................ 160/5 |
| 3,675,023 | 7/1972 | Kunke et al. . |
| 3,860,055 | 1/1975 | Wild ........................... 160/5 |
| 3,884,414 | 5/1975 | Baer . |
| 3,885,152 | 5/1975 | Anetseder, Sr. et al. . |
| 3,918,513 | 11/1975 | Englund ................ 160/176 R |
| 4,027,655 | 6/1977 | Feldl . |
| 4,080,978 | 3/1978 | McCabe . |
| 4,167,898 | 9/1979 | Barcant . |
| 4,173,721 | 11/1979 | Louis .................... 160/176 R |
| 4,255,899 | 3/1981 | Braithwaite . |
| 4,424,850 | 1/1984 | Klein ........................ 160/5 |

*Primary Examiner*—Reinaldo P. Machado
*Attorney, Agent, or Firm*—Sigalo & Levine

[57] ABSTRACT

Improved method and apparatus for automatically moving a set of venetian type window blinds or similar louvered window coverings or partitions between open or closed positions in response to sensing a predetermined level of solar energy imposed on the window or opening across which the covering is to be disposed.

28 Claims, 8 Drawing Figures

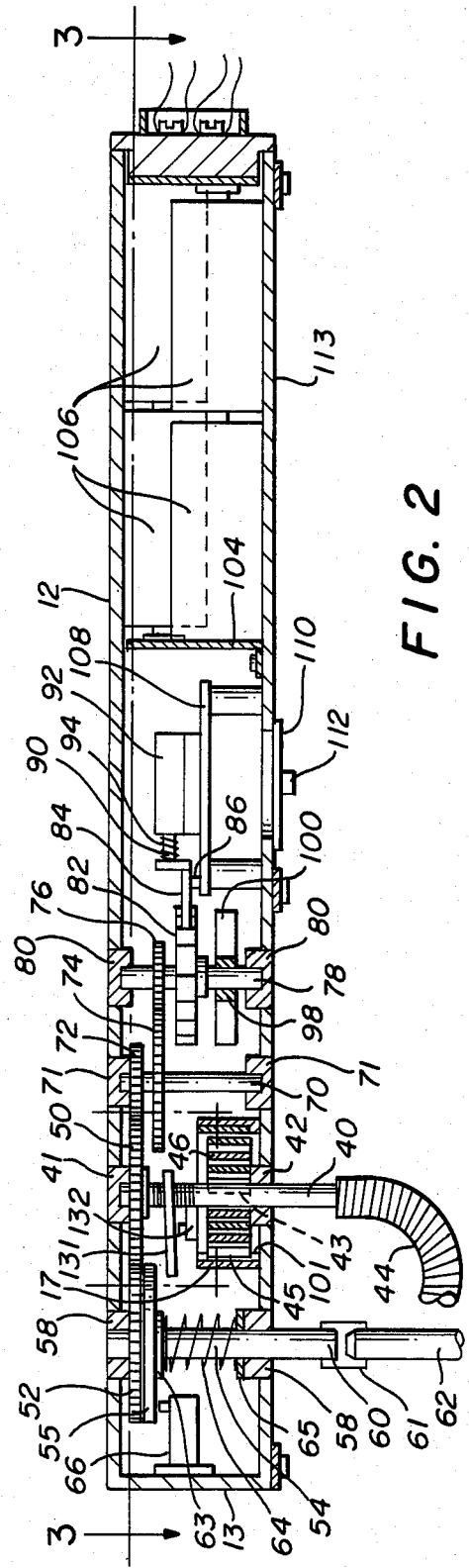
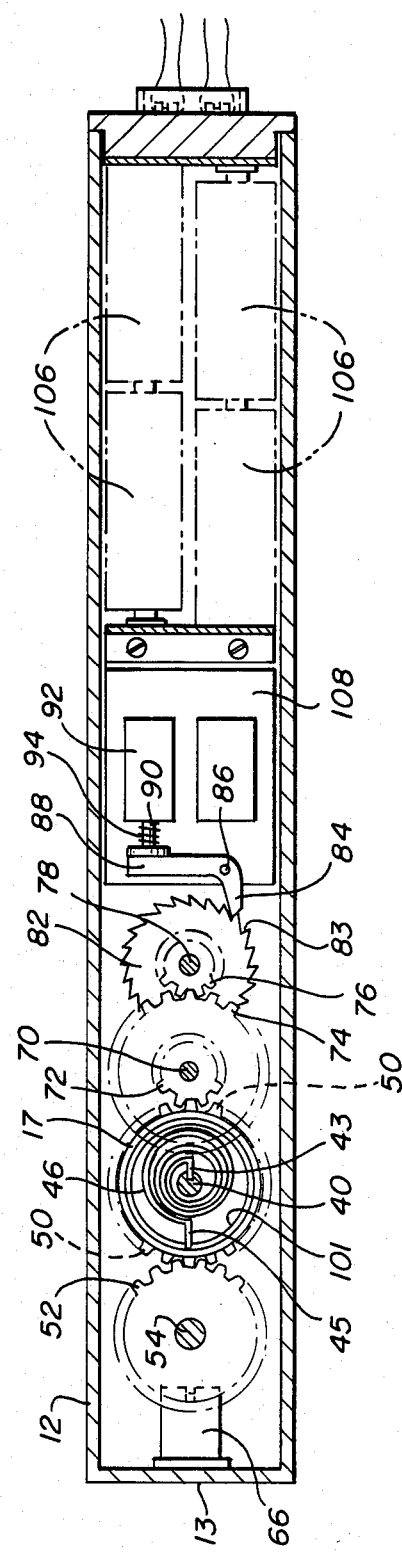
FIG. 2
FIG. 3

AUTOMATIC CLOSING SYSTEM FOR WINDOW BLINDS

BACKGROUND OF THE INVENTION

1. Field of the Invention

The present invention pertains to apparatus for automatically closing venetian blinds or similar louvered window coverings and the like or lowering pleated shades in response to sensing a predetermined level of heat, such as solar energy through the window.

2. Background

Several systems have been developed for automatically opening and closing louvered window coverings and the like, including venetian blinds and similar window cover structures. Although fairly well developed and complicated systems have been provided which not only sense predetermined levels of solar energy, but also may be operated according to a predetermined time cycle, there has been a need in the art of window blind systems for a device which is relatively uncomplicated and, in particular, may be retrofitted to existing window blind installations. Most, if not all systems in the prior art are adapted only to be used in conjunction with new window blind installations or require substantial modification of existing blinds or louver mechanisms.

However, the vast number of existing residential and commercial buildings which can be retrofitted with automatic blind closing devices makes the development of such device particularly attractive and necessary to the conservation of energy. It is to this end that the present invention has been developed with a view to providing a superior low cost, reliable device which may be retrofitted to existing blind installations as well as used in conjunction with new blind or louvered partition systems.

SUMMARY OF THE INVENTION

The present invention provides an improved apparatus for automatically moving a set of venetian type window blinds or similar louvered window coverings or partitions between opened and closed positions in response to sensing a predetermined level of solar energy imposed on the window or opening across which the covering is to be disposed.

In accordance with an important aspect of the present invention, there is provided a device for automatically closing a set of window blinds wherein the conventional rotary blind actuating shaft is connected directly to the novel device and the window blinds may be manually operated between open and closed positions through the device or the device may be automatically actuated to close the window blinds in response to sensing a predetermined decrease or increase in the level of solar energy beamed on the window to be covered by the blinds. The apparatus of the present invention may be operated to automatically close a set of window blinds upon sensing a predetermined decreasing level of solar energy so that, for example, during nighttime hours the blinds may be automatically closed to prevent loss of building interior heat through a window for which the blinds have not been manually closed. The apparatus may also be operated to automatically close the blinds during daylight hours in response to an increasing level of solar energy to prevent excessive cooling loads on a building interior space.

In accordance with another important aspect of the present invention there is provided a device which utilizes a relatively small amount of electrical energy which may be provided by storage batteries, which themselves are maintained at a suitable charge level by a solar or light sensitive energy conversion device for generating a sufficient amount of electrical energy to maintain the batteries in a charged condition. The batteries are utilized to power an electrical circuit which includes means for sensing the level of solar energy imposed on the window covered by the blinds and to initiate operation of a suitable mechanism for effecting closure of the blinds when the predetermined solar energy level is sensed.

In accordance with yet a further aspect of the present invention, there is provided a mechanical blind closing mechanism which utilizes the stored energy of a mechanical spring which is released to effect closure of the blinds by a drive mechanism including a reduction gear drive train and a ratchet and pawl locking mechanism which is activated by a solenoid actuator to effect release of stored energy in the spring mechanism to move the blinds between open and closed positions.

In accordance with still a further aspect of the present invention, there is provided a device for retrofitting existing venetian blind closure mechanisms with an automatic system for moving the blinds between open and closed positions wherein a manual blind actuating rod or baton is provided for moving the blinds manually through the retrofit device and wherein the manual operation of opening the blinds or closing the blinds stores energy in a device which is then used to drive the blind opening and closing mechanism in the other direction under predetermined conditions.

The present invention holds several advantages in the art of window blind operating mechanisms, in particular, by providing a device for moving the blinds automatically in one direction to either open or close the blinds in response to a signal and providing for manual actuation of the blinds in one or both directions. The device is particularly adapted for retrofitting existing blind installations and for use with new blind installations without substantial modification of the conventional blind actuating mechanism or its housing or enclosure.

Those skilled in the art will recognize the above described advantages and superior features as well as other aspects of the present invention upon reading the detailed description which follows in conjunction with the drawings.

BRIEF DESCRIPTION OF THE DRAWINGS

FIG. 2 is a longitudinal central section view of the blind operating apparatus taken from line 2—2 of FIG. 1;

FIG. 3 is a section view of the apparatus taken from line 3—3 of FIG. 2;

DESCRIPTION OF THE PREFERRED EMBODIMENT

Figure 1:
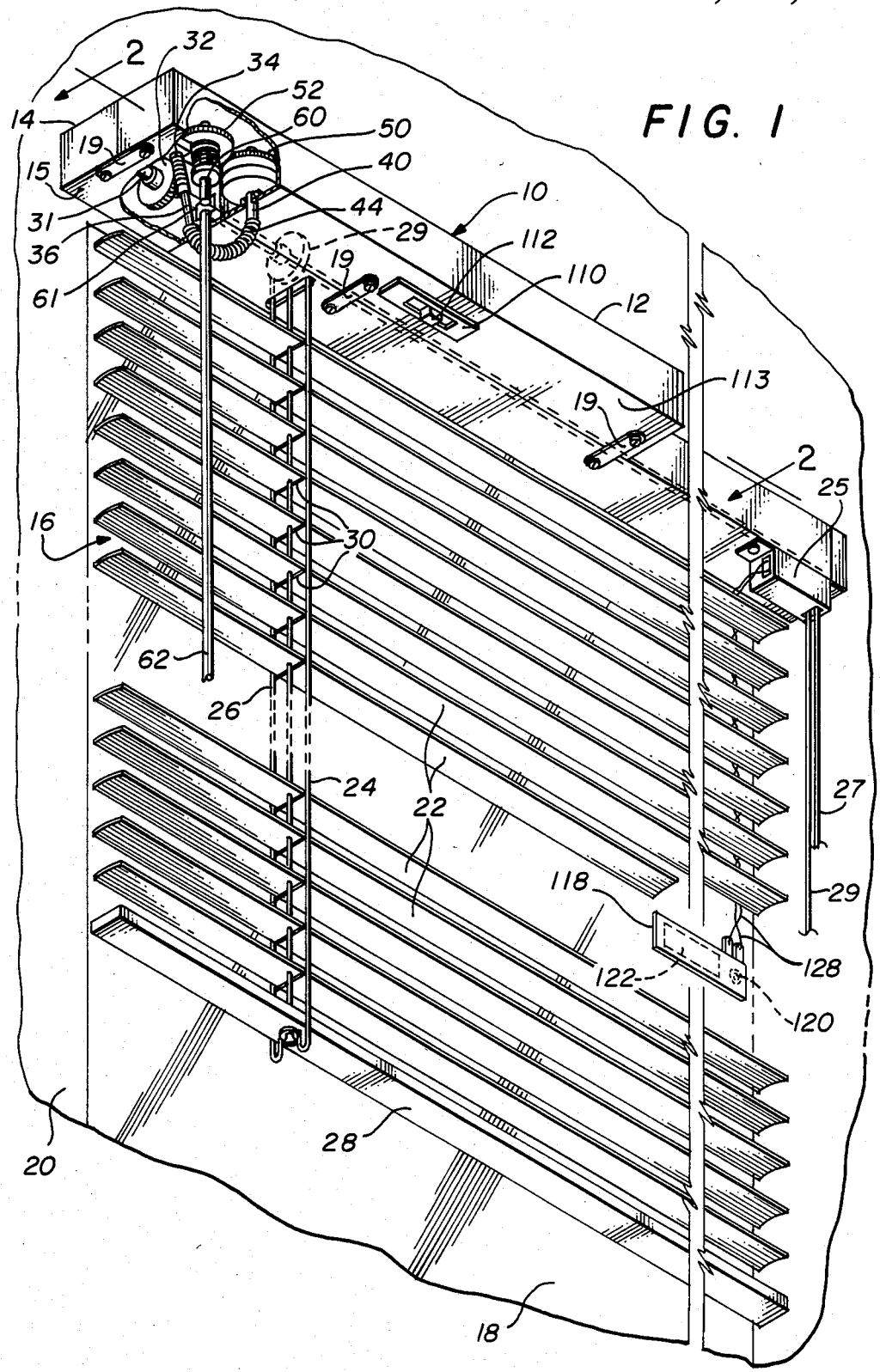
FIG. 1 is a perspective view of a venetian blind assembly installed at a window and including the blind operating apparatus of the present invention.

In the description which follows, like parts are marked throughout the specification and drawings with the same reference numerals, respectively. The drawing figures are not necessarily to scale and certain features of the invention may be shown exaggerated in scale or in somewhat schematic form in the interest of clarity and conciseness.

Referring to FIG. 1 and FIG. 2, in particular, the apparatus of the present invention is illustrated and generally designated by the numeral 10. The apparatus 10 is enclosed in a relatively compact, elongated rectangular housing 12, which is suitably secured by means 19 to a generally rectangular housing 14 forming part of an existing window blind closure system or assembly 16 shown in FIG. 1. The blind closure assembly 16 is shown disposed adjacent to a conventional window pane 18 set in a suitable frame 20 as shown in FIG. 1. The window blind closure 16 is of conventional construction and includes suitable mechanism within the housing 14 for supporting a plurality of spaced apart blind louvers 22. The blind louvers 22 are supported in a conventional manner by spaced apart opposed vertically hanging cords or tapes 24 and 26 (only one set of which is shown for clarity) which extend from the housing 14 to a master louver or weight 28. Short connecting cords or tapes 30 extend between the cords 24 and 26 and directly support the louvers 22. In addition, cords 27 and 29 are used to raise or lowering master weight 28 thus raising or lowering the entire louver group to any desired height as is well known in the art.

A window blind release device 25 is attached to the bottom 15 of housing 14 to deactivate the existing mechanical blind release typically installed to hold the blinds at any particular height as will be discussed in relation with FIG. 6. The blind height control cords 27 and 29 are then fed into and out of release device 25 which has a solenoid therein to automatically drop the blinds when required as will be explained hereinafter in relation to FIG. 5 and FIG. 6.

The blind support cords 24 and 26 extend into the housing 14 through suitable openings in a bottom wall 15 and are connected to a sheave or drum 29 supported on a shaft 31, which is suitably mounted in the housing 14 and connected to a worm gear 32. The worm gear 32 is drivenly connected to a worm 34 mounted on a shaft 36 which extends through the bottom wall 15 of the housing 14. The shaft 36 is suitably supported on bearing means (not shown) within the interior of the housing 14.

In a conventional blind installation as described above, the shaft 36 is typically connected by a flexible coupling, not shown, to an elongated baton whereby the shaft 36 may be rotated manually in opposite directions to translate the cords 24 and 26 vertically in opposite directions to adjust the angle or slant of the connecting cords 30 whereby the louvers 22 may be moved in unison between substantially open positions to admit light and a substantially closed position covering the window pane 18. The blind closure assembly 16 is primarily exemplary and the detailed structural features may vary from one conventional design to another.

The apparatus 10 is adapted to be retrofitted to existing blind closure systems such as the assembly 16 and, by way of illustration only, the apparatus 10 is particularly adapted for connection to the blind closure system through the operating shaft 36. Those skilled in the art will recognize that the basic structural and functional aspects of the apparatus 10 may be modified to work in conjunction with several types of conventional blind operating systems.

Referring now particularly to FIG. 2 and FIG. 3, the inventive apparatus 10 includes a generally vertically extending drive shaft 40 mounted for rotation in the housing 12 on spaced apart bearing means 41 and 42. After the baton originally coupled to shaft 36 in FIG. 1 is removed (in a retrofit application), the shaft 40 of the novel device 10 is then connected to the shaft 36 (which opens and closes the blinds) by way of a flexible coupling or shaft portion 44. The coupling 44 is, for example, preferably formed of a relatively short length of tightly coiled spring wire or the like which provides for transmitting rotary motion from the shaft 40 to the shaft 36 in one direction or the other for opening and closing the louvers 22. The shaft 40 is also drivably connected to motor means comprising a torsion coil spring 46 which may typically comprise a generally flat band of spring steel anchored to the shaft 40 at its inner end at 43 as shown in FIG. 3 and at its opposite end 45 to a portion 17 of the housing 12. Accordingly, in response to rotating the shaft 40 in the clockwise direction as shown in FIG. 3, the spring 46 is wound tightly around the shaft to store energy therein which urges the shaft 40 to rotate in the opposite direction. The spring 46 is, of course, sized sufficiently to provide the torque and total energy expenditure necessary to rotate the blind louvers 22 between a fully open and fully closed position.

Figure 7:
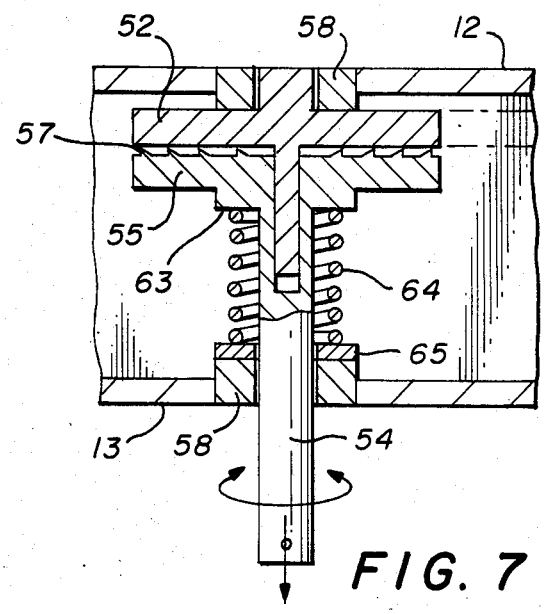
FIG. 7 is a diagrammatic representation of the pull release/manual blind opening and closing mechanism.

Referring further to FIG. 2 and FIG. 3, the shaft 40 is adapted to support a gear 50, suitably keyed to the shaft 40 for rotation therewith, and meshed with a gear 52 mounted on a second shaft 54 supported in the housing 12 adjacent to and generally parallel with the shaft 40. The shaft 54 is suitably coupled to the gear 52 for rotation therewith through a friction clutch 55 having a serrated surface 57 (as shown in FIG. 7) and is supported in the housing 12 on suitable spaced apart bearing means 58. The shaft 54 is axially movable relative to the housing 12 and the bearing means 58 and includes a distal end portion 60 connected by way of a flexible coupling or bail 61 to an elongated actuating baton 62 which hangs downward from the housing 12 a sufficient distance to be manually grasped and rotated for rotatably driving the shaft 54 and the shaft 40 through the friction clutch 55 and gears 52 and 50. A coil spring 64 is disposed in the housing 12 around the shaft 54. The spring 64 is disposed between and engaged with a collar 63 on the shaft 54 and a bearing washer 65 and is adapted to bias the shaft 54 and its corresponding friction clutch 55 in the position illustrated in FIG. 2 with the gears 52 and 50 meshed with each other.

A normally open miniature switch 66 is mounted on an endwall 13 of the housing 12 in a position whereby downward movement of the shaft 54 and friction clutch 55 will cause the clutch 55 to engage the switch 66 to energize an electrical circuit to activate the blind closing (or opening) mechanism which will be described in further detail herein. The position of the switch 66 is such that the clutch 55 and gear 52 will become disengaged from each other before the clutch 55 engages the switch to effect operation of the aforementioned control circuit.

The blind operating apparatus 10 further includes an idler gear shaft 70 mounted adjacent to the shaft 40 and supported in the housing 12 by bearings 71 for rotation relative to the housing 12. A pinion gear 72 is mounted on the shaft 70 adjacent to a gear 74 and is meshed with the gear 50. The gear 74 is meshed with a pinion gear 76 mounted on and keyed for rotation with a shaft 78. The shaft 78 is also mounted in the housing 12 for rotation in suitable bearing means 80. The shaft 78 also supports lock means including a toothed ratchet wheel 82 which is suitably secured to the shaft 78 for rotation therewith and is engageable with a ratchet pawl 84 supported in the housing 12 for pivotal movement about a pivot pin 86. The pawl 84 includes a crank arm portion 88 (FIG. 3) which is operably connected to an actuator plunger 90 of a solenoid actuator 92. A coil spring 94 is disposed around the plunger 90 and is connected at one end to the plunger 90 for urging the crank arm to rotate in a clockwise direction about the pivot pin 86 as shown in FIG. 3 for biasing the pawl 84 into engagement with one of the teeth 83 of the ratchet wheel 82.

In response to energization of the solenoid 92 when microswitch 66 is closed by disengaging clutch 55 from gear 52, the plunger 90 is moved to the left, as shown in FIG. 2 and FIG. 3, to rotate the pawl 84 in a counterclockwise direction to release the ratchet wheel 82 for rotation with the shaft 78. The shaft 78 also supports a dynamic braking device comprising a paddle wheel 98 (FIG. 2) secured to the shaft 78 and having a plurality of radially projecting, circumferentially spaced blades 100 which are fully feathered to resist rotation and to reduce abrupt acceleration and deceleration of the gear train including the gears 50, 72, 74 and 76.

Accordingly, the torsion coil spring 46 is now operable to bias the gear 50 for rotation in the counterclockwise direction which, through the idler or countershaft 70, biases the ratchet wheel 82 to also rotate in the counterclockwise direction upon release of the ratchet wheel 82 by movement of the pawl 84 out of engagement with the ratchet wheel 82. The energy stored in the spring 46 may thus be used to rotate the shaft 40 and the shaft 36 (FIG. 1) to move the blind louvers 22 between open and closed positions in response to energization of the solenoid 92.

If the blind louvers 22 are rotated to the closed position in response to the actuation of switch 66 to cause the pawl 84 to release the ratchet wheel 82, the acceleration of the shaft 40 is retarded by the braking device 98 so that a relatively smooth closure motion of the louvers 22 occurs. The louvers 22 may, of course, be reopened by rotation of the baton 62 with the clutch 55 coupled to and rotating gear 52 and gears 52 and 50 meshed with each other whereby the shaft 40 is rotated directly to wind the spring 46 simultaneous with manual rotation of the shaft 36 to reopen the louvers 22. When the blinds 22 are fully open, clutch 55 slips with respect to gear 52 so that continued rotation of baton 62 has no further effect on blinds 22 or spring 46. The anchor point for the spring 46 may be connected to suitable torque limiting means 101 comprising a sleeve disposed within the housing portion 17 and operable to rotate relative to the housing 12 at a predetermined limit torque exerted on the spring 46 by the shaft 40. Accordingly, continued rotation of the baton 62 to effect clockwise rotation of the gear 50, as shown in FIG. 3, will not be limited by the windup of the spring 46 but instead by the limit position of the blinds 22 in moving to a fully open or an inverted, closed position as selected by the baton operator.

As previously mentioned, if the baton 62 is pulled downwardly against the bias of the spring 64, clutch 55 will separate from gear 52 and switch 66 will be actuated to energize the solenoid 92 to effect release of the ratchet wheel 82 and the gear train to allow the spring 46 to unwind and move the louvers 22 to the closed position. Accordingly, the apparatus 10 may be manually actuated to move the blind closure assembly 16 in both directions between louver open and closed positions.

The solenoid 92 may be energized through actuation of the switch 66 or through actuation and response to other criteria such as the increase or decrease in the level of solar energy imposed on the window pane 18. Referring further to FIG. 2 and FIG. 3, the apparatus 10 includes electrical control and energy source means for use in conjunction with a sensing means 118 (FIG. 1) for sensing a predetermined level of solar energy to effect operation of the apparatus 10 to move the blind louvers 22 between open and closed positions in response to a predetermined level of solar energy imposed on the window pane 18. The housing 12 includes suitable support structure 104 for supporting a plurality of rechargable storage batteries 106. The batteries 106 are suitably connected to provide a source of energy for a control circuit including a circuit board 108 mounted in the housing 12 and supporting the solenoid 92 thereon. The circuit board 108 includes a selector switch 110 including a sliding switch lever 112 projecting from the bottom wall 113 of the housing 12 and adapted to condition the circuit for operating the solenoid 92 in accordance with a selected operating mode.

Referring to FIG. 1, the apparatus 10 includes means comprising a support panel 118 for supporting a sensor element 120 and a photosensitive energy conversion element 122 for use in charging the batteries 106. The panel 118 is preferably formed from a relatively thin sheet of plastic having an adhesive coating formed thereon for attaching the panel to the interior surface of the window pane 18, for example. Suitable miniature conductors 128 are adapted to interconnect the panel 118 with the control circuit in the housing 12 for transmitting a signal to the control circuit from the sensor 120 and for connecting the batteries 106 to a source of electric energy comprising the element 122.

Figure 4:
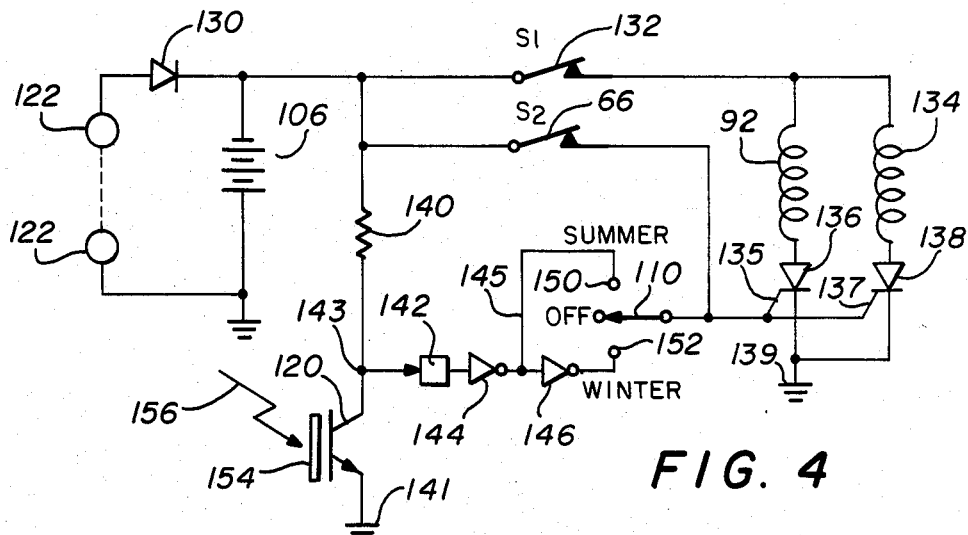
FIG. 4 is a circuit diagram of the control circuit used for operating the solenoid actuators and recharging the batteries used in the blind operating apparatus.

FIG. 4 is the electrical diagram for the circuits used to control the louvers 22 in the present invention and includes the photosensitive energy conversion elements 122 which may be, for example only, cadmium sulfide cells which generate power when exposed to light. The current generated by cells 122 is coupled through diode 130 to battery 106 to charge it. Diode 130 prevents the battery voltage from being coupled back to the cells 122 when they are not generating voltage or current. The voltage from battery 106 is coupled through switch 132 to solenoid coils 92 and 134. Solenoid coil 92 is the solenoid which operates crank arm portion 88 to release pawl 84 to allow the torsion coil spring 46 to bias the gear 50 for rotation in the counterclockwise direction thus rotating shaft 40 and connected shaft 36 in FIG. 1 to move the blind louvers 22 between open and closed positions in response to energization of solenoid 92.

Solenoid 134 is coupled to a pinch roller as will be explained more fully in connection with FIG. 6 to release cords 27 and 29 shown in FIG. 1 in the event that the louvers are in the raised position. Energization of solenoid 134 would allow the louvers to be dropped from the raised position simultaneously with the closing of the louvers by the actuation of relay 92.

Switch 66 shown in FIG. 4 is the microswitch 66 illustrated in FIG. 2 which is actuated when baton 62 is pulled downwardly against spring 64. As explained previously, when baton 62 is pulled downwardly against spring 64, it releases clutch 55 from gear 52 and subsequently actuates microswitch 66. As shown in FIG. 4, when microswitch 66 is actuated, a voltage is applied to the actuating gates 135 and 137 of silicon controlled rectifiers 136 and 138 respectively enabling them to be energized or "turned on". This allows a current from the battery to flow through switch 132, relay coils 92 and 134, and corresponding silicon controlled rectifiers 136 and 138 to the ground terminal 139. Thus, solenoids 92 and 134 are both actuated which, as described previously, allow not only the louvers to be driven by spring 46 to the closed position but also allows the louvers to drop to their full length position if they happen to be in the raised position. As spring 46 rotates shaft 40, it causes arm 131 (FIG. 1) to move down the threads on shaft 40. When the louvers have reached their fully closed position, arm 131 has moved down sufficiently to contact microswitch 132 thus opening switch 132 and removing the power from the solenoids 92 and 134 shown in FIG. 4 thus de-energizing the circuits. Silicon controlled rectifiers 136 and 138 are three junction, three terminal PNPN thyristors that are normally open circuits in both directions. When the proper signal is applied to the gate electrodes 135 and 137 through switch 66 the devices switch rapidly to a conducting state and allow current flow in the forward direction just as in a conventional rectifier. Each silicon controlled rectifier 136 and 138 remains turned on when the gate voltage is removed and it can be turned off by removing the anode voltage by opening switch 132. Thus the louvers can be driven to the closed position and dropped from the raised position manually by pulling baton 62 downwardly against spring 64 to actuate microswitch 66.

In the automatic operation of the circuit, phototransistor 120 is activated by light 156 passing through filter 154 and couples the voltage from battery 106 through resistor 140 to ground terminal 141. Thus, the voltage at junction 143 of resistor 140 and phototransistor 120 drops to substantially ground potential. This change in voltage is coupled to a delay circuit 142. The purpose of the delay circuit 142 is to prevent operation of the circuit because of transient light pulses. For instance, if, on a cloudy day, a sudden break in the clouds allows the sun to strike the phototransistor 120 momentarily, the sudden change in voltage at junction 143 will not actuate the circuit until a predetermined period of time has elapsed which would indicate that the sunlight is still present thus allowing the louvers to be automatically closed. If this were not the case, a momentary view of sunlight by means of a break in the clouds would trigger the circuit and close the blinds when in fact a few minutes later the sun would be behind the clouds again. Such delay circuit 142 is old and well known in the art and will not be discussed in detail herein except to state that it is adjustable and the time can be set manually for any particular type of day depending upon the number of clouds and the like. The output from delay circuit 142 (ground potential) is coupled to an inverter 144 which produces an output signal on line 145 to terminal 150. If operation of the device is in the summertime, switch 110 can be coupled to terminal 150 which is the summer terminal. This means that the signal appearing on line 145 would be a voltage potential sufficient to actuate silicon controlled rectifiers 136 and 138 and allow solenoids 92 and 134 to be actuated thus closing the louvers and dropping the blinds if they happen to be in the raised position.

If the operation of the device is in the wintertime, switch 110 is coupled to terminal 152. In that case, when there is no sunshine, such as in the evening when the sun goes down, it is desired to close the blinds so that the radiant heat in the house or building cannot escape. In that case, phototransistor 120 would suddenly stop conducting when the sun is no longer producing light 156. The voltage would rise at junction 143 and would be coupled through delay circuit 142 to inverter 144. Thus, no output would appear on line 145 because of inverter 144. However, with no signal on line 145, inverter 146 produces an output signal on line 152 which would pass through switch 110 to gates 135 and 137 and energize or activate silicon control rectifiers 136 and 138 as previously described to close the blinds.

In both cases, in summer and winter, whenever the blinds are actuated by having solenoid 92 activated, as soon as spring 46 has caused the shaft 40 to rotate sufficiently to close the blinds, switch 132 is activated by arm 131 (FIG. 2) thus opening the circuit to silicon controlled rectifiers 92 and 134 and removing the power therefrom. In such cases, of course, the pawl arm 84 is released by solenoid 92 and once again engages teeth 83 of ratchet wheel 82 to prevent rotation thereof. Of course, as explained previously, when baton 62 is rotated manually in the other direction, the blind louvers are not only opened but spring 46 is again compressed and energy stored therein, microswitch 132 is again closed with the movement of arm 131 upwardly on the threads of shaft 40 and the unit is restored to its previous operating condition awaiting either the next manual or automatic operation thereof.

Figure 5A:
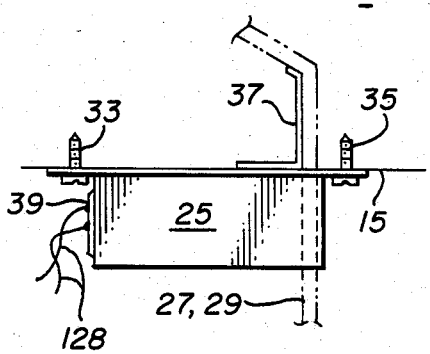
FIG. 5A and FIG. 5B are side and end views respectively of the window blind release mechanism.

FIG. 5A is a side view of the window blind release device 25 which has means for attaching the unit to the bottom wall 15 housing 14 to control the blinds if they happen to be in the raised position. It is attached by means such as screws 33 and 35 and has a vertically extending arm 37 thereon which disengages the normally existing pinch roller which controls the position of the blinds in the vertical direction.

Figure 5B:
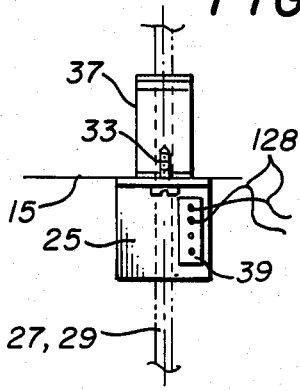

FIG. 5B is an end view of the window blind release device 25 illustrating the electrical pin connector 39.

Figure 6:
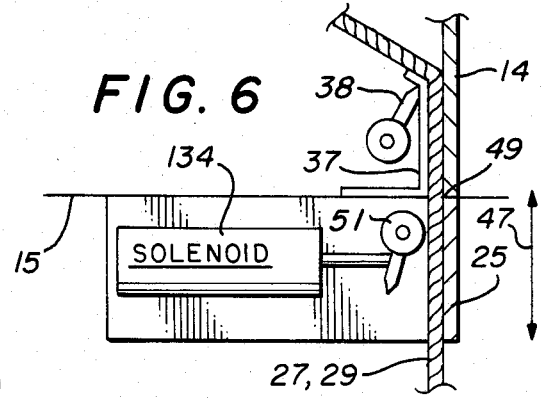
FIG. 6 is a diagrammatic representation of the interior of the window blind release mechanism.

FIG. 6 is an internal view of the window blind release device 25 illustrating how barrier strip 37 is inserted between the existing pinch roller 38 is a bearing means and the cords 27 and 29 so that the existing pinch roller 38 can no longer affect them and yet which allows free motion of cords 27 and 29 between the barrier strip 37 and the housing 14. The cords 27 and 29 are then extended through a space 49 in the window blind release device 25 adjacent a new pinch roller 51 that is operated by solenoid 134. When the solenoid 134 is activated, it pulls pinch roller 51 away from cords 27 and 29 thus allowing free motion of the cord upwardly or downwardly as shown by arrows 47. When the solenoid 134 is deenergized, it forces pinch roller 51 against cords 27, 29 in a well known manner thus pinning them between the pinch roller 51 and the housing 25 thereby locking the cords 27, 29 in that position. Thus, if the blinds have been raised and cords 27, 29 have been pulled downwardly in the direction shown by arrow 47, the cords are then held in that position by solenoid 134 forcing pinch roller 51 against the cords 27, 29 and locking them against case 25. When solenoid 134 is activated, it pulls the pinch roller 51 away from cords 27, 29 allowing the weight 28 of the blinds to pull them downwardly by gravity to the fully extended position. Solenoid 134 is deactivated as explained previously in relation to FIG. 4 when switch 132 is opened. Pinch roller 51 is designed in a well known manner such that the cords 27, 29 can be pulled down against it to raise the blinds if necessary but it will not allow the cords 27, 29 to move upwardly to lower the blinds until the solenoid 134 is activated.

The details of the pull/release manual by operated clutch 55 for manually opening and closing the blinds is disclosed in FIG. 7. Baton 62 has attached to the upper portion thereof a clutch 55 which has serrated surface 57 thereon to engage the lower or under portion of gear 52. Thus, when shaft 54 is rotated clockwise by turning baton 62 as viewed from the top in FIG. 7, the serrated surface of clutch 55 containing teeth 57 powers the gear train to close the blinds manually. Rotating shaft 54 counterclockwise as viewed from the top causes spring 46 (FIG. 2 and FIG. 3) to be wound and the blinds opened. After the spring 46 has been wound, and a predetermined torque level determined, further winding of shaft 62 causes the teeth 57 to slip with respect to the lower portion of gear surface 52. The torque level, of course, is determined by the tension of spring 64 and the angles of teeth 57 with respect to the undersurface of gear 52. This allows the three following manual operations to be performed as discussed previously. First, by pulling shaft 54 against spring 64, a separation of clutch 55 and gear 52 is effected thus allowing the spring 46 to power the blinds to the closed position. Secondly, by manually rotating shaft 54 in one direction, the blinds can be reopened and the spring 46 rewound to prepare it for the next automatic or manual operation to close the blinds. Third, by winding shaft 54 in the opposite direction, the blinds can be manually closed in the normal fashion.

Thus, there has been disclosed a novel apparatus for allowing a louvered blind to be closed automatically upon the attainment of a certain light level at the windows adjacent the blinds but which also allows the blinds to be opened and closed in the normal manner if desired.

Although a preferred embodiment of the invention has been described in detail herein those skilled in the art will recognize that various substitutions and modifications may be made to the specific construction and function of the elements illustrated without departing from the scope and spirit of the invention as recited in the appended claims.

We claim:

1. A window blind louver control comprising:
   a. a plurality of blind louvers moveable between open and closed positions,
   b. a first control device coupled to said louvers for manually moving said louvers to a first one of said open or closed positions,
   c. a power storage device coupled to said first control device for storing energy as said louvers are manually moved to said first one of said open or closed positions, and
   d. a second control device coupled to said power storage device for causing said power storage device to selectively move said louvers to a second one of said open or closed positions.

2. A window blind louver control as in claim 1 wherein said second control device comprises:
   a. a pawl and ratchet wheel preventing said power storage device from moving said louvers when said pawl engages said ratchet wheel, and
   b. means for disengaging said pawl from said ratchet wheel to allow said power storage device to move said louvers to a second one of said open or closed positions.

3. A window blind louver control as in claim 2 wherein said pawl disengaging means comprises:
   a. a first solenoid coil operatively coupled to said pawl for disengaging said pawl from said ratchet wheel upon energization of said first solenoid coil,
   b. a power supply, and
   c. means for selectively coupling said power supply to said first solenoid coil to disengage said pawl from said ratchet wheel thereby allowing said power storage device to move said louvers to the second one of said open or closed positions.

4. A window blind louver control as in claim 3 wherein said power supply coupling means comprises a silicon controlled rectifier having an anode and a cathode coupled in series with said power supply and said first solenoid coil and a gate electrode for receiving a signal causing said rectifier to conduit thereby energizing said first solenoid coil and disengaging said pawl from said ratchet wheel and moving said blind louvers to the second one of said open or closed positions.

5. A window blind louver control as in claim 4 further comprising:
   a. a first switch manually operable by said first control device and electrically coupled to said power supply and said rectifier gate whereby manual movement of said first control device causes said switch to couple said signal to said rectifier gate thereby energizing said first solenoid coil to cause movement of said louvers to said second one of said open or closed positions, and
   b. a second light operated switch electrically coupled to said power supply and said rectifier gate whereby a predetermined light level impinging upon said light operated switch energizes said first solenoid coil to cause movement of said louvers to said second one of said open or closed positions.

6. A window blind louver control as in claim 5 further including:
   a. a first gear coupled to said blind louvers for causing said louvers to move between said open and closed positions,
   b. a clutch plate attached to said first control device for releaseable frictional engagement with said first gear,
   c. a spring attached to said first control device and said clutch plate for urging said clutch plate in frictional engagement with said first gear, and
   d. means attached to said first control device for selectively rotating said first gear to manually open or close said louvers or for releasing said clutch plate from engagement with said first gear to operable engagement with said first manually operated switch thereby allowing automatic movement of said blinds between said open and closed positions.

7. A window blind louver control as in claim 6 wherein said means attached to said first control device comprises an elongated baton which can be rotated to rotate said first gear or pulled to disengage said clutch from said first gear and engage said clutch with said first manually operated switch.

8. A window blind louver control as in claim 7 further including:
   a. a phototransistor as said light operated switch coupled to said power supply for producing a change in output voltage when a predetermined light level impinges upon said phototransistor,
   b. means coupled to said phototransistor for producing a first output signal representing a need to close said blinds when said light is present,
   c. means coupled to said first output signal producing means for producing a second output signal representing a need to close said blinds when said light is absent, and
   d. a single-pole, triple-throw switch coupled to said first and second output signal producing means and said silicon controlled rectifier gate whereby when said switch is in a first position, said first signal actuates said first solenoid coil to close said blinds when said light is present as in summer, when said switch is in a second position said second signal actuates said first solenoid coil to close said blinds when said light is absent as in winter, and when said switch is in said third position said first solenoid coil actuating circuit is disconnected from said light operated switch.

9. A window blind louver control as in claim 8 further including:
   a. at least a first cord for raising and lowering said blind in elevation,
   b. a pinch roller for releaseably engaging said cords thereby releaseably holding said blinds in any given elevation,
   c. a second solenoid coil and series coupled second silicon controlled rectifier coupled in electrical parallel with said first solenoid coil and first silicon controlled rectifier, and
   d. means operatively coupling said second solenoid to said pinch roller for releasing said cord upon energization of said second solenoid coil whereby said blinds are lowered by gravity.

10. A window blind louver control as in claim 9 further including:
    a. a second normally closed microswitch electrically coupled between said power supply and said first and second silicon controlled rectifiers, and
    b. means for opening said second switch when said blinds have completely travelled between said open and closed positions whereby said first and second silicon controlled rectifiers are electrically disabled and said first and second solenoid coils are de-energized.

11. A window blind louver control as in claim 10 further comprising:
    a. light activated means for generating electrical power, and
    b. means coupling said electrical power to said power supply for storing said electrical power when said light activates said power generating means.

12. A window blind louver control as in claim 11 further including:
    a. rechargeable batteries as said power supply, and
    b. cadmium sulfide cells electrically coupled to said batteries for generating electrical power to charge said batteries when light impinges on said cells.

13. A window blind louver control as in claim 12 wherein said power storage device is a coiled spring.

14. A method of moving window blind louvers between an open and a closed position comprising the steps of:
    a. storing energy in a power storage device when said blinds are manually moved from a first one of said open or closed positions to the other with a control device, and
    b. utilizing said stored energy to selectively move said blinds from said other position to the first position.

15. A method as in claim 14 wherein the step of utilizing said stored energy further comprises the steps of:
    a. coupling a pawl and ratchet wheel to said power storage device to prevent louvers from being moved when said pawl engages said ratchet wheel, and
    b. selectively releasing said pawl from engagement with said ratchet wheel to allow said power storage device to move said louvers from said other position to said first position.

16. A method as in claim 15 wherein the step of releasing said pawl further comprises the steps of:
    a. operatively coupling a first solenoid coil to to said pawl for disengaging said pawl from said ratchet wheel upon energization of said first solenoid coil,
    b. providing a power supply, and
    c. selectively coupling said power supply to said first solenoid coil to disengage said pawl from said ratchet wheel thereby allowing said power storage device to move said louvers to the second one of said open or closed positions.

17. A method as in claim 16 wherein the step of selectively coupling said power supply to said first solenoid coil further comprises the steps of coupling a silicon controlled rectifier anode and cathode in series with said power supply and said first solenoid coil and receiving a signal on a gate electrode of said silicon controlled rectifier to cause said rectifier to conduct thereby energizing said first solenoid coil and disengaging said pawl from said ratchet wheel and moving said blind louvers to the second one of said open or closed positions.

18. A method as in claim 17 further comprising the steps of:
    a. electrically coupling a first manually operable switch to said power supply and said rectifier gate whereby manual movement of said control device causes said switch to couple said signal to said rectifier gate thereby energizing said first solenoid coil to cause movement of said louvers to said second one of said open or closed positions, and
    b. coupling a light operated switch to said power supply and said rectifier gate whereby a predetermined light level impinging upon said light operated switch energizes said first solenoid coil to cause movement of said louvers to said second one of said open or closed positions.

19. A method as in claim 13 further comprising the steps of:
    a. coupling a first gear to said blind louvers for causing said louvers to move between said open and closed positions,
    b. attaching a clutch plate to said first control device for releaseable frictional engagement with said first gear,
    c. attaching a spring to said control device and said clutch plate for urging said clutch plate in frictional engagement with said first gear, and d. attaching means to said first control device for selectively rotating said first gear to manually open or close said louvers or for releasing said clutch plate from engagement with said first gear to operable engagement with said first manually operated switch thereby allowing automatic movement of said blinds between said open and closed positions.

20. A method as in claim 19 further including the step of attaching an elongated baton to said first control device as said means which can be rotated to rotate said first gear or pulled to disengage said clutch from said first gear and engage said clutch with said first manually operated switch.

21. A method as in claim 20 further comprising the steps of:
   a. coupling a phototransistor to said power supply as said light operated switch for producing a change in output voltage when a predetermined light level impinges upon said phototransistor,
   b. coupling a first output signal producing means to said phototransistor for producing said first output signal representing a need to close said blinds when said light is present,
   c. coupling a second output signal producing means to said first output signal producing means to generate a second output signal representing a need to close said blinds when said light is absent, and
   d. coupling a single-pole, triple-throw switch to said first and second output signal producing means and said silicon controlled rectifier gate whereby when said switch is in a first position, said first signal actuates said first solenoid coil to close said blinds when said light is present as in summer, when said switch is in a second position said second signal actuates said first solenoid coil to close said blinds when said light is absent as in winter and when said switch is in said third position, said first solenoid coil actuating circuit is disconnected from said light operated switch.

22. A method as in claim 21 further including the steps of:
   a. raising and lowering said blinds with at least a first cord,
   b. releaseably engaging said cord with a pinch roller thereby releaseably holding said blinds in any given elevation,
   c. coupling a second solenoid coil and series coupled second silicon controlled rectifier in electrical parallel with said first solenoid coil and first silicon controlled rectifier, and
   d. operatively coupling said second solenoid to said pinch roller for releasing said cord upon actuation of said second solenoid coil whereby said blinds are lowered by gravity.

23. A method as in claim 10 further including the steps of:
   a. electrically coupling a second normally closed microswitch between said power supply and said first and second silicon controlled rectifiers, and
   b. opening said second switch when said blinds have completely travelled between said open and closed positions whereby said first and second silicon controlled rectifiers are electrically disabled and said first and second solenoid coils are de energized.

24. A method as in claim 23 further comprising the steps of:
   a. generating electrical power by light actuated means, and
   b. coupling said electrical power to said power supply for storing said electrical power when said light activates said power generating means.

25. A method as in claim 24 further comprising the steps of:
   a. providing rechargeable batteries as said power supply, and
   b. electrically coupling cadmium sulfide cells to said batteries for generating electrical power to charge said batteries when light impinges on said cells.

26. A method as in claim 25 further comprising the step of utilizing a coiled spring to form said power storage device.

27. In a window blind closure system having a component housing suspending a plurality of blind segments and a baton coupled to a shaft means for moving said segments between open and closed positions, the improvement comprising:
   a. a second housing attached to said first housing,
   b. means in said second housing coupled to said shaft means in said first housing for moving said blinds between open and closed positions,
   c. a power storage device in said second housing for storing energy when said blinds are manually moved from a first one of said open or closed positions to the other, and
   d. means in said second housing for selectively coupling said power storage device to said shaft means for moving said blind segments from said other position to said first position.

28. An improved method of window blind louver control of a plurality of blind louvers suspended from a component housing and moveable between open and closed positions by means of a baton coupled to a shaft, the improvement comprising the steps of:
   a. attaching a second housing to said first housing,
   b. coupling means in said second housing to said shaft means in said first housing for moving said blinds between open and closed positions,
   c. storing energy in a power storage device in said second housing when said blinds are manually moved from a first one of said open or closed positions to the other, and
   d. selectively coupling-said power storage device to said blind segment shaft in said component housing to move said blinds from said other position to said first position.

* * * * *

UNITED STATES PATENT AND TRADEMARK OFFICE
CERTIFICATE OF CORRECTION

PATENT NO. : 4,644,990
DATED : February 24, 1987
INVENTOR(S) : James E. Webb and William F. Dunn It is certified that error appears in the above-identified patent and that said Letters Patent are hereby corrected as shown below:

IN THE SPECIFICATION:

Column 9, line 13, the term "Baton 62" should be--Shaft 54--.

line 14, the term "serrated surface" should be--teeth--.

line 24, the numeral "62" should be--54--.

IN THE CLAIMS:

Column 10, line 24, the term "conduit" should be--conduct--.

Column 14, line 8, the term "de ener-" should be --de-ener--.

Signed and Sealed this

Eighteenth Day of August, 1987

*Attest:*

DONALD J. QUIGG

*Attesting Officer*     *Commissioner of Patents and Trademarks*